United States Patent [19]

Parmelee

[11] Patent Number: 5,057,259
[45] Date of Patent: Oct. 15, 1991

[54] METHOD AND APPARATUS FOR INJECTION MOLDING CONTINUOUS PRODUCTS

[75] Inventor: G. Kendall Parmelee, Riverside, Conn.

[73] Assignee: Erblok Associates, Charlottesville, Va.

[21] Appl. No.: 357,039

[22] Filed: May 25, 1989

[51] Int. Cl.$^5$ .................. B29C 33/36; B29C 41/26; B29C 41/46

[52] U.S. Cl. .................................. 264/166; 264/167; 264/216; 264/310; 264/328.2; 264/328.8; 264/328.11; 264/328.16; 425/224; 425/543; 425/547; 425/552; 425/572; 425/576

[58] Field of Search ............. 264/165, 166, 167, 216, 264/234, 236, 237, 345, 347, 348, 310, 328.2, 328.8, 328.11, 328.16; 425/224, 447, 449, 471, 543, 547, 572, 576, 588, 814, 552, 574

[56] References Cited

U.S. PATENT DOCUMENTS

| | | | |
|---|---|---|---|
| 3,758,657 | 9/1973 | Menzin et al. | 264/166 |
| 4,096,225 | 6/1978 | Kowalski | 264/167 |
| 4,350,656 | 9/1982 | Moertel | 264/166 |
| 4,431,399 | 2/1984 | Moertel | 425/576 X |
| 4,461,738 | 7/1984 | Russell | 264/166 X |

Primary Examiner—Leo B. Tentoni
Attorney, Agent, or Firm—Parmelee, Bollinger & Bramblett

[57] ABSTRACT

The method and apparatus for injection molding of continuous molded products employs a single endless flexible mold band having multiple injection ports revolving in registration with a rotating cylindrical mold member. This cylindrical mold member comprises a wide wheel rim or a circumferential wall on a rotating drum. Continuous mold cavities extend in parallel relationship circumferentially around the periphery of the cylindrical mold member. Injection ports in the mold band are kept in alignment with these mold cavities by sprocket teeth of the mold member engaging with sprocket holes in margins of the band. Fluid plastic material (either thermoplastic material or thermosetting material) is injected through these ports into the mold cavities. When injecting thermoplastic material, heaters warm the cylindrical mold member and band prior to injection; then coolers chill them for cooling the thermoplastic material for solidifying it. For extending endless molded products from between the revolving mold member and band, the band is guided away from the mold member. After removal of products, the revolving band is guided back into re-engagement with the sprocket teeth in registration with the revolving cylindrical mold member for repeating continuous cycles of operation. When injecting thermosetting plastic material, the revolving mold member and band are cooled prior to injection and are then heated following injection for solidifying the molded thermosetting plastic products.

18 Claims, 4 Drawing Sheets

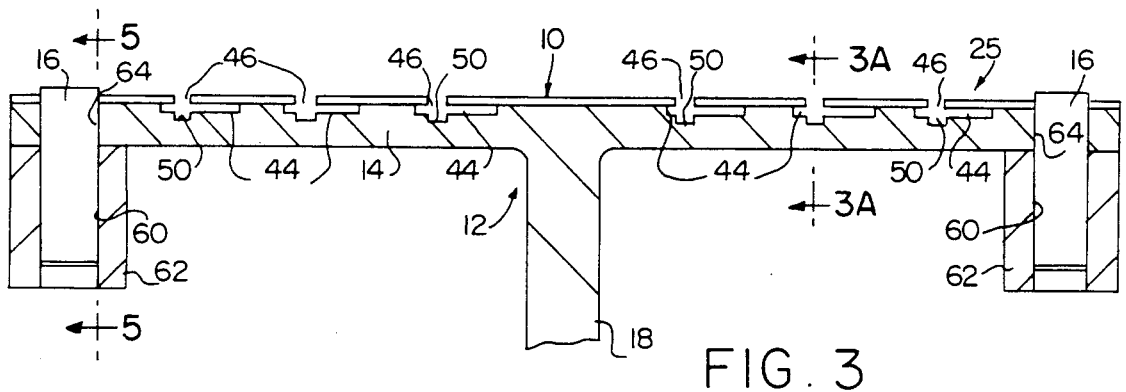
FIG. 3
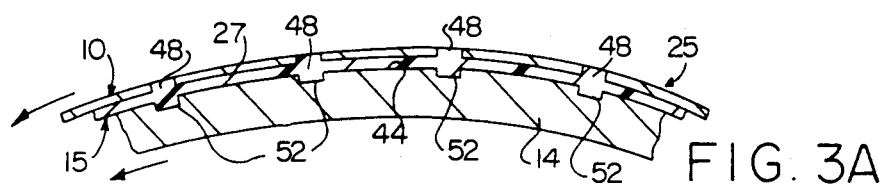
FIG. 3A
FIG. 4
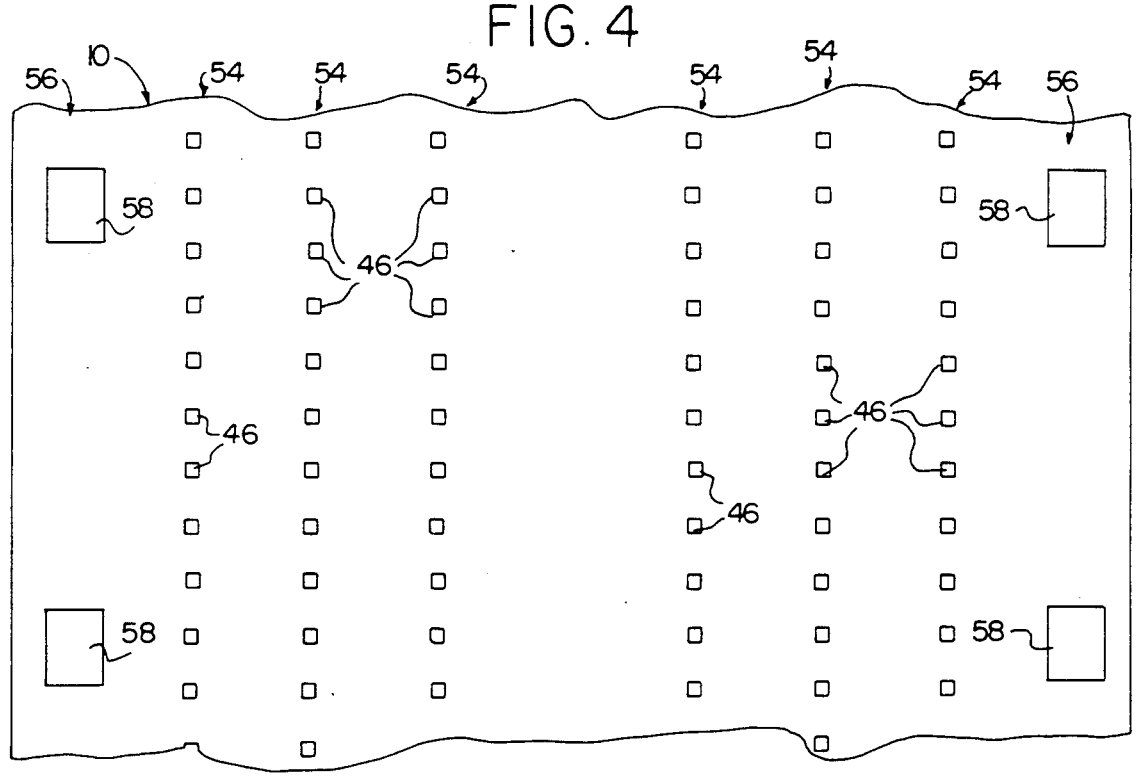

METHOD AND APPARATUS FOR INJECTION MOLDING CONTINUOUS PRODUCTS

CROSS-REFERENCE TO RELATED APPLICATION

There ia a cross-reference to copending application Ser. No. 07/310,522, filed on Feb. 13, 1989, now U.S. Pat. No. 4,999,067 by George H. Erb and Susan E. Beard.

FIELD OF THE INVENTION

This invention is in the field of continuous injection molding, and more particularly relates to the continuous injection molding from thermoplastic or thermosetting one or more continuous molded products employing a rotary cylindrical mold member with an endless flexible mold band caused to revolve in registration with the cylindrical mold member forming a continuously revolving injection mold.

BACKGROUND

The present invention has as its point of departure the method and system for producing hook fastener strips disclosed and claimed in the prior copending patent application, Ser. No. 07/310,522, filed Feb. 13, 1989, now U.S. Pat. No. 4,999,067 of George H. Erb and Susan E. Beard. The disclosure of that patent application is incorporated herein by reference.

In that method and system, a plurality of flexible molding bands are layered together forming a continuously revolving injection mold. The melted thermoplastic polymeric material is injected into the layered bands through injection ports in the uppermost band. After the heated plastic material has been cooled, the layered bands which comprise the continuously revolving mold are separated to enable the continuous strips of molded product to be removed.

SUMMARY OF THE DISCLOSURE

In the present method and system, there is only one flexible mold band, and it revolves around a rotating cylindrical mold member on a mold wheel (or, in a second embodiment, on a rotating mold drum). The flexible mold band is held in registration with the cylindrical mold member on the periphery of the wheel (or drum) by sprocket teeth on the wheel or drum. Then, after solidification of the molded plastic material, the revolving mold band is separated from the cylindrical mold member on the periphery of the wheel or drum for enabling removal of the molded product from the continuously revolving mold. The mold product is a continuous product, for example, such as a continuous strip or multiple strips of hook fasteners having mounting lugs on opposite faces of each strip of hooks, as discussed and claimed in that Erb and Beard patent application.

In addition to sprocket holes, the single mold band has rows of apertures (injection ports) through which the melted plastic material is injected into the revolving mold. These injection ports also serve to mold lugs on one surface of each molded continuous strip product, similar to the uppermost mold band in said application.

The present revolving wheel or drum has mold cavities in the peripheral surface of the cylindrical mold member for molding a strip or multiple strips of hook fasteners and for molding the lugs on the opposite side of the molded product from the lugs which are molded by the injection ports in the single mold band.

Although a strip or strips of hooks are described as examples of continuous products, it will be understood that other continuous molded products can be produced having lugs on at least one surface formed by the injection ports in the single mold band.

BRIEF DESCRIPTION OF THE DRAWINGS

The invention, together with further aspects, objects, features and advantages thereof will be more clearly understood from a consideration of the following description taken in connection with the accompanying drawings which are arranged for clarity of illustration and not necessarily to scale, and in which like reference numerals are used to refer to corresponding elements throughout the various views.

FIG. 1 is a view looking from the plane 1—1 in FIG. 2.

FIG. 3 shows the upper portion of the mold wheel and mold band of FIG. 2 enlarged.

FIG. 3A is an enlargement of a section of FIG. 3 taken along the plane 3A—3A in FIG. 3.

FIG. 4 is a plan view of a portion of the mold band.

FIG. 6 is a side elevational cross-sectional view taken along the plane 6—6 in FIG. 7.

DETAILED DESCRIPTION OF PREFERRED EMBODIMENTS

Figure 1:
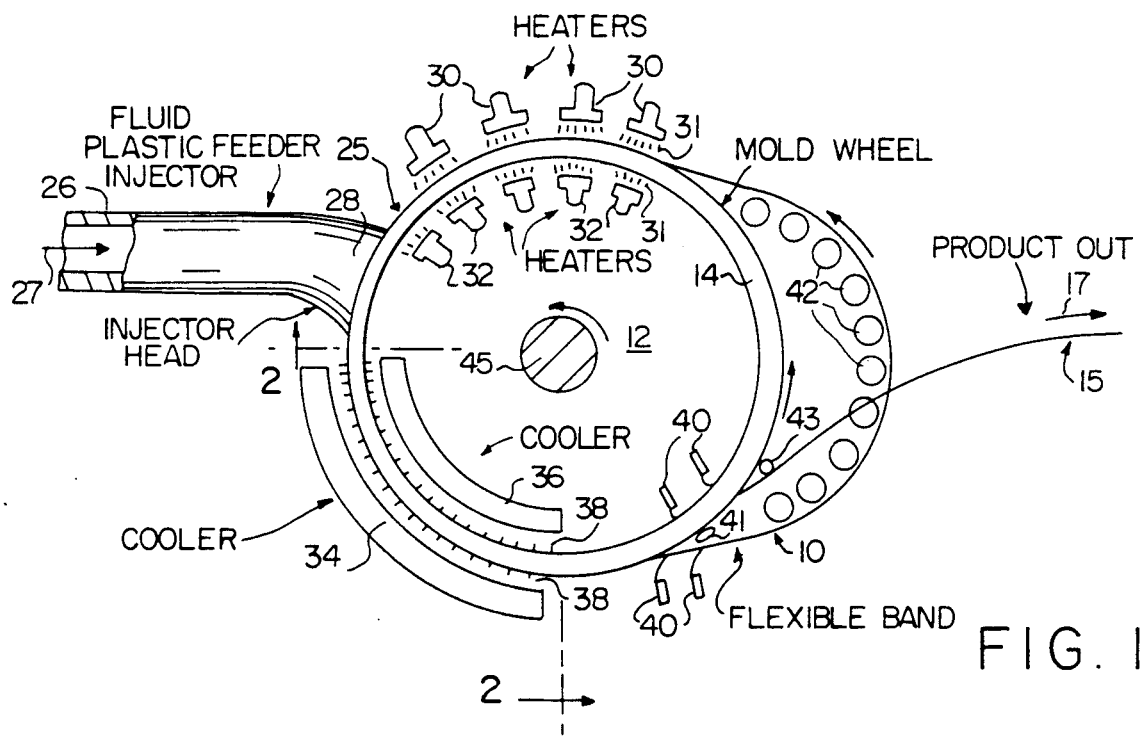
FIG. 1 is a side elevational and partial cross-sectional view showing the method and system of this invention.
Figure 2:
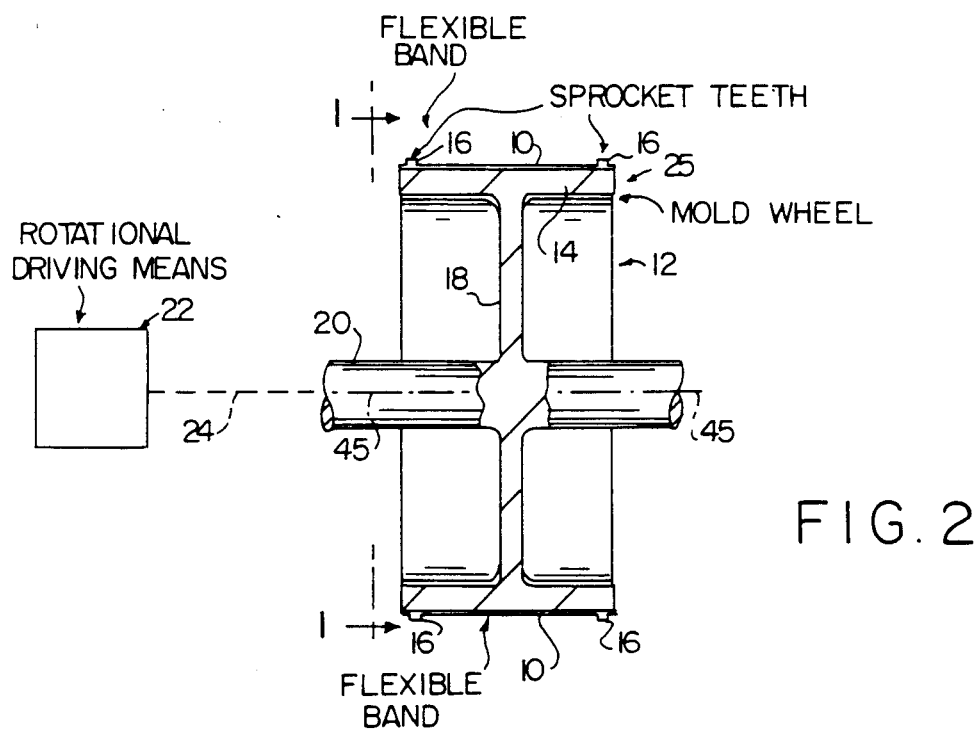
FIG. 2 is a cross-sectional view taken along the planes 2—2 in FIG. 1 showing the flexible mold band, sprocket teeth and mold wheel. For clarity of illustration, the heaters and coolers as shown in FIG. 1 are omitted from FIG. 2.

In FIGS. 1 and 2, a flexible mold band 10 is revolved around a rotating mold wheel 12 having a wide flange rim 14 which forms a circular cylindrical mold member. The peripheral surface of this cylindrical flange member 14 includes mold cavities for forming a molded product 15, for example, multiple strips of hook fasteners such as shown and claimed in the referenced Erb and Beard patent application. These mold cavities will be explained in more detail later. The mold band 10 includes a row of sprocket holes along each margin engaging with sprocket teeth 16 projecting from the peripheral surface of the rim member 14 for keeping the mold band 10 in registration with the rotating mold wheel 12 while the revolving band is travelling in contact with the revolving peripheral surface of this wheel.

The mold wheel 12 includes a centrally located radial web 18 (FIG. 2) mounted on a drive shaft 20 rotatably journalled in bearings (not shown). Controllable speed rotational driving means 22 are connected by a driving connection 24 to the drive shaft 20 for rotating the mold wheel and for causing the mold band to be revolved by the sprocket teeth 16, so as to travel in registration with the circular cylindrical mold rim member 14.

In order to inject melted thermoplastic polymeric material 27 into the continuously revolving injection mold 25 comprising the band 10 in contact with the cylindrical mold member 14, there is a melt feed injector 26 having an injector head 28 in firm sliding contact with the revolving band 10. This injector head 28 is similar to the injector head shown and described in the referenced patent application. The melt feed injector 26 is any suitable equipment for continuously feeding melted plastic material under pressure through the injector head 28 into the continuously revolving mold 25. For example, this melt feed injector 26 may comprise a helical feed-screw type of injector, or it may comprise a twin-shaft continuous mixer of the type commercially available from Farrel Corporation of Ansonia, Conn., having a positive-displacement metering gear pump at the outlet from the continuous mixer for exactly metering the melted plastic flow rate and for pressurizing the flow of melted plastic material being fed through the injector head 28. The melt feed injector 26 may also comprise a "DISKPACK" (Trademark) rotary processor of the type commercially available from Farrel Corporation.

A plurality of heaters 30, shown as radiant heaters, are aimed radially inwardly toward the outside surface of the revolving band 10, and another plurality of these stationary radiant heaters 32 are aimed radially outwardly toward the inside surface of the cylindrical mold member 14. These latter heaters 32 are arranged equally on both sides of the central web 18 (FIG. 2) for uniformly heating the cylindrical mold member 14 by radiant heat energy 31 while the outer heaters 30 are also arranged for uniformly heating the band 10 by similar radiant heat energy 31.

In order to reduce the thermal mass of the cylindrical mold member 14 insofar as practicable, it is made as thin as possible consistent with requisite strength. Also, this mold member is corrosion resistant and has a coefficient of thermal expansion closely matching the coefficient of thermal expansion of the flexible mold band 10. This flexible mold band is made of strong, durable corrosion resistant material, for example, such as stainless steel.

For cooling the cylindrical mold member 14 and the mold band 10 after the melted plastic material has been injected into the revolving mold 25 from the injector head 28, there are outer and inner coolers 34 and 36, respectively. The purpose of these coolers 34 and 36 is to cool the revolving mold 25 sufficiently to cool the thermoplastic material 27 in this mold below its melting temperature, so that the molded continuous strip products 15 moving along parallel paths will retain their molded shape and can be removed from this revolving mold 25. For example, these coolers 34 and 36 may be directing continuous blasts of cold fluid 38, such as chilled air, against the outside surface of the band 10 and against the inside surface of the mold member 14. This cold fluid 38 may be chilled water, in which case there are stationary wiper blades 40, such as squeegees for wiping and diverting residual water off from the band and from the rim mold member.

To remove the continuous products 15 from the mold 25, the mold band 10 is separated from the wheel 12 by running the band around an arcuate group of stationary guide rollers 42 (FIG. 1). Each continuous strip of molded product 15 is guided and led away from the inside surface of the flexible band 10 while this band is travelling along a straight path after the band has separated from the wheel 12 and before the band has arrived at the first guide roller 42.

For causing the strip product 15 to separate from the band 10, there is a retainer guide 41, for example, a guide shoe or roller. This retainer guide 41 presses radially inwardly to keep the molded continuous products 15 in the mold cavities of the revolving wheel cylindrical mold member 14 as the band 10 is separating from the periphery of this wheel mold member. Then, for causing each continuous product 15 to become separated from the mold member 14, there is a separator guide 43, for example, a guide wedge or roller, positioned beneath (radially inwardly of) each continuous product and adjacent to the periphery of the mold member, so that the continuous products 15 must diverge from the mold member 14 as these products are being led out from the mold, as shown by the arrow 17.

As shown in FIGS. 3 and 3A, there are a plurality of mold cavities 44 in the periphery of the cylindrical mold member 14. Each of these mold cavities 44 is endless and encircle the axis 45 of rotation of the wheel. Thus, the mold cavities 44 are parallel and are concentric with the axis of rotation 45 (FIGS. 1 and 2).

One of the endless mold cavities 44 and a portion of the overlying mold band 10 are further enlarged in FIG. 3A with molded plastic material 27 being shown continuous mold. The mold band includes injection ports 46 (Please see also FIG. 4) for enabling melted plastic to be injected into the revolving mold cavities 44 and for forming lugs 48 (FIG. 3A) on the molded product 15. Each endless mold cavity 44 may include inwardly extending depressions 50 aligned with the ports 46 for forming lugs 52 (FIG. 3A) on the opposite side of the continuous molded strip product 15 from the lugs 48, for example, such lugs as are shown in the referenced patent application for mounting the continuous hook-row products 15 onto suitable backing strips for making hook fastener tapes, similar in usage to "VELCRO" (Trademark) hook fastener tapes.

As seen in plan view in FIG. 4, the mold band 10 includes multiple parallel rows 54 of the injection ports 46. These rows 54 of ports 46 extend longitudinally along the band, and they are aligned with and overlie the endless mold cavities 44 for enabling the injector head 28 to fill the continuous cavities 44 through the ports 46 as the mold 25 continuously revolves.

In order to drive the mold band 10 and to keep this band in registration with the endless mold cavities 44, there is a row 56 of uniformly spaced sprocket holes 58 extending along in each margin of the mold band. These sprocket holes 58 have an open area at least five times as large as the open area of the sprocket holes in the uppermost band in the referenced application, and these sprocket holes 58 are spaced apart longitudinally along the band at least twice as far. For engaging into the relatively large sprocket holes 58, there are two rows of sprocket teeth 16 projecting radially outwardly from the peripheral surface of the cylindrical mold member 14. These sprocket teeth 16 can be affixed directly to the cylindrical member 14, as seen in FIG. 2.

Figure 5:
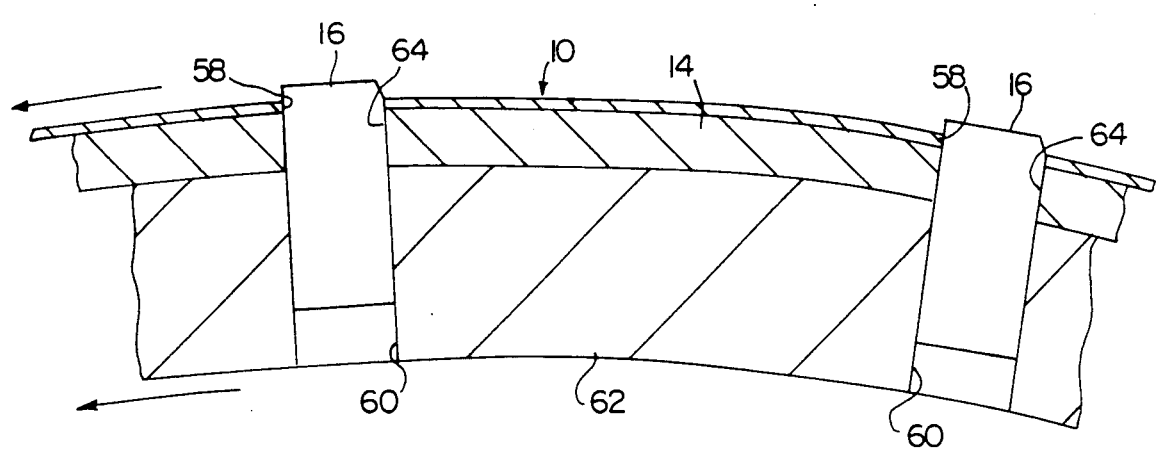
FIG. 5 is an enlargement of a section of FIG. 3 taken along the plane 5—5 in FIG. 3, showing sprocket teeth engaging in sprocket holes in the flexible mold band.

Alternatively, as shown in FIGS. 3 and 5, these sprocket teeth 16 can be mounted by affixing in radially bored sockets 60 in a pair of hoops 62 which are positioned adjacent to the inner surface of the cylindrical mold member 14 at the respective margins of this mold member. These hoops 62 are firmly in contact with the inner surface of the mold member 14; they have essentially the same coefficient of thermal expansion as the mold member; and they serve to support and to stiffen the margins of this cylindrical mold member. The sprocket teeth 16 project radially outwardly from each hoop 62 through apertures 64 in the margins of the mold member 14. The front face of each sprocket tooth 16 projects essentially radially outwardly with a very slight rake rearwardly outwardly, as seen in FIG. 5, and the rear face of each sprocket tooth has a more pronounced rake forwardly outwardly. This rake (or slight taper) of each sprocket tooth facilitates its smooth re-entry into a sprocket hole 58 as the mold band and mold wheel merge with each other, as seen in FIG. 1, just prior to their arrival at the first of the heaters 30.

Figure 6:
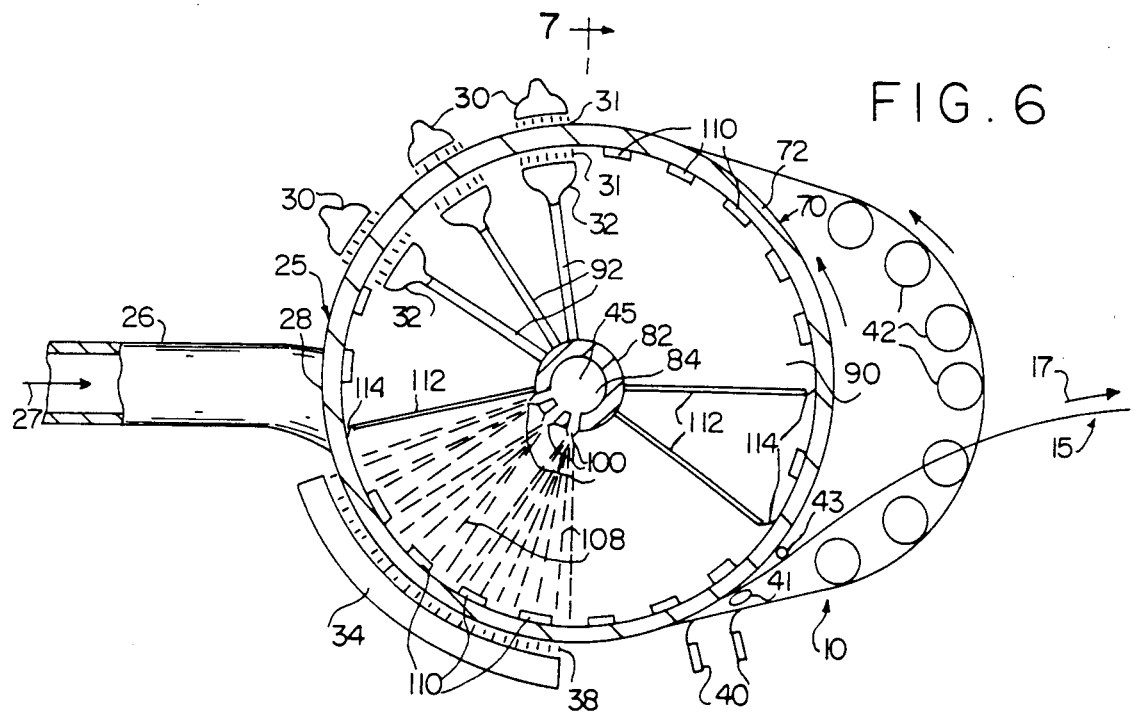
FIG. 6 shows a second embodiment of the invention in which a revolving mold drum is used in lieu of the revolving mold wheel.
Figure 7:
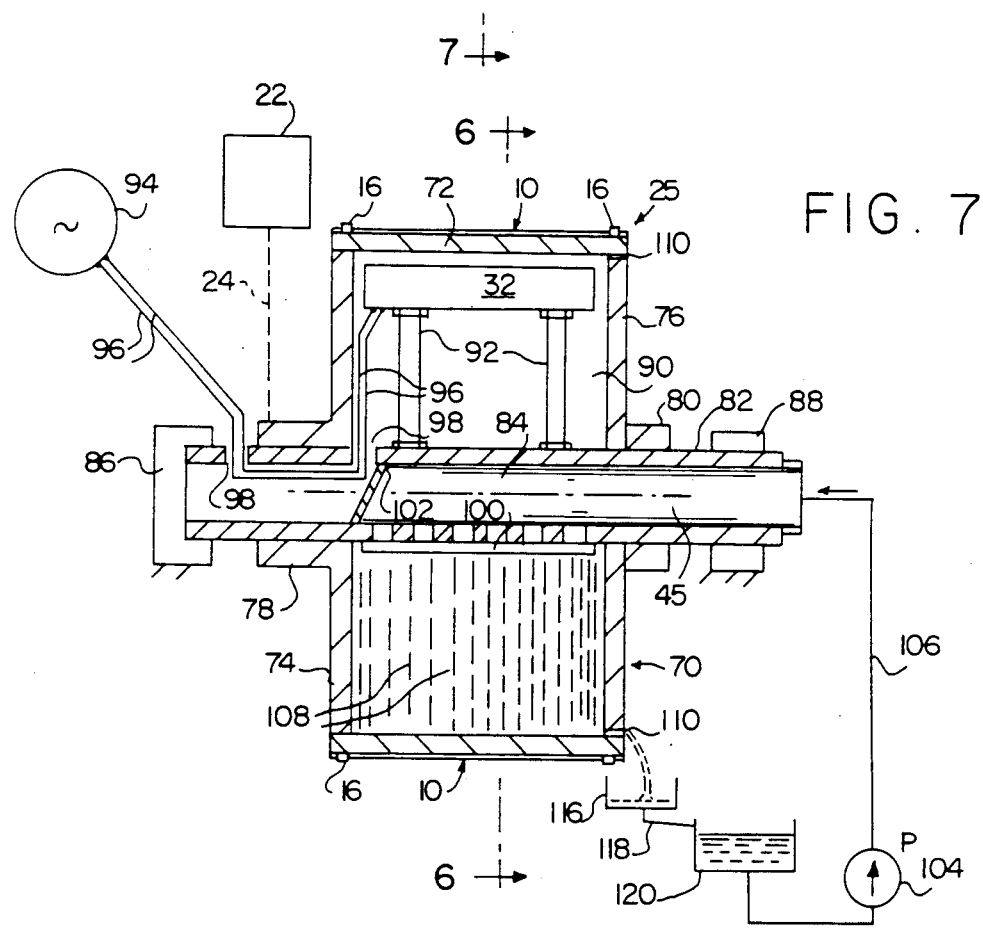
FIG. 7 is an axial sectional view as seen along the plane 7—7 in FIG. 6.

In the embodiment of the invention shown in FIGS. 6 and 7, a rotating mold drum 70 and a revolving flexible mold band 10 define a continuously revolving injection mold 25. The drum 70 includes a circular cylindrical drum mold member 72 supported by first and second end walls 74 and 76 carried by respective first and second hubs 78 and 80 rotatably mounted on a stationary hollow shaft 82 having a bore 84. A first end of this shaft 82 is fixed in a stationary mounting block 86, and its second end is fixed in and extends through a second stationary mounting block 88, for reasons to be explained later. Rotational driving means 22 of controllable speed are connected through a driving connection 24 to the first hub 78 for rotating the mold drum 70 and also for causing the mold band 10 to be revolved in registration with the drum mold by sprocket teeth 16 engaging in sprocket holes 58 (FIG. 4) in the two margins of the mold band 10.

It is to be understood that, like the cylindrical wheel mold member 14, the periphery of the cylindrical drum mold member 72 also has a plurality of endless parallel mold cavities (not shown) encircling the drum and concentric with its rotational axis 45. These mold cavities in the periphery of the cylindrical drum mold member 72 are aligned with the injection ports (not shown in FIGS. 6 and 7) in the single mold band 10, so that the melt feed injector 26 with its head 28 can fill the continuously revolving mold 25 with melted thermoplastic polymeric material 27 injected through the ports in the band 10.

The end wall 76 is removably secured to the drum member 72 and is formed in two separable halves, and the hub 80 is formed in two separable halves, so that this end wall and its hub can be removed for providing access to the hollow interior region 90 of the drum 70.

The inner radiant heaters 32 are stationary being mounted on brackets 92 attached to the stationary shaft 82. These radiant heaters 32 are energized by an electrical energy source 94 through insulated electrical conductors 96 extending into the drum interior through a portion of the stationary shaft bore 84 and extending into and out of this bore through shaft bore access ports 98.

In order to cool the cylindrical drum mold member 72, there are a plurality of fluid spray nozzles 100 connected to the stationary shaft 82 and aimed at the inner surface of this mold member 72. The shaft bore 84 is plugged fluid-tight by a barrier 102 for separating the cooling fluid from the electrical conductors 96. A source 104 of pressurized fluid, for example, a chilled-air pump or a chilled-water pump, is connected via a conduit 106 to the bore 84 of the hollow shaft, where this shaft opens out through its mounting block 88, thereby providing cooling fluid sprays 108 issuing from nozzles 100 and impinging on the inner surface of the cylindrical mold member 72.

In order to allow the sprayed fluid 108 to exhaust from the drum interior 90, there are a multiplicity of escape outlets 110 in the end wall 76 near the cylindrical mold member 72. As shown in FIG. 6, there are stationary radial partitions 112 attached to the shaft 82 and extending out adjacent to the inner surface of the mold member 72 and also adjacent to the end walls 74 and 76. These partitions 112 serve to separate the fluid sprays 108 from the radiant heaters 32. These partitions have wiper seals 114 mounted thereon in sliding contact with the inner surfaces of the mold member 72 and with the inner surfaces of both end walls 74 and 76 for keeping the cooling fluid separated from the heaters 32.

If the cooling fluid 108 is water, then water escaping through the outlets 110 is captured in a trough 116 to be returned via a conduit 118 to a reservoir 120 for supplying the pressurized pump source 104.

In view of the greater thermal mass of the cylindrical mold member 14 or 72 relative to the mold band 10, the inner heaters 32 and the inner coolers 36 or 100 are arranged to provide a relatively greater heating and cooling effect, respectively, than the outer heaters 30 and coolers 34, so that the temperature levels of the cylindrical mold member substantially match the temperature levels of the mold band around the circumference of the revolving injection mold 25.

In further embodiments of the invention, thermosetting plastic material 27 can be injected instead of thermoplastic material as described above. In order to use thermosettable plastic material, the relative positions of the heaters and coolers are interchanged. Thus, the coolers serve to cool the mold band and cylindrical mold member prior to injecting, so that the revolving injection mold 25 is below thermoset temperature as the fluid thermosettable plastic material 27 prior to thermoset is injected through the fluid plastic feeder injector 26 and injector head 28.

Then, following injecting of the fluid thermosetting plastic material 27, the heaters serve to elevate the temperature of the revolving mold 25 above thermoset temperature level for solidifying the molded continuous products 15 prior to their being removed from the revolving mold, as indicated by the arrow 17 showing the endless molded strip products 15 being led out from the mold.

While the novel features of the invention have been illustrated and described in connection with specific embodiments of the invention, it is believed that the embodiments will enable others skilled in the art to apply the principles of the invention in forms departing from the exemplary embodiments herein, and such departures are contemplated by the claims and equivalents of the claimed elements.

I claim:

1. The method of continuous injection molding at least one continuous strip of molded plastic product with lugs thereon comprising the steps of:
   providing a circular cylindrical mold member rotatable around an axis of rotation concentric with a peripheral surface of the cylindrical mold member, said mold member having at least one endless mold cavity extending circumferentially in said peripheral surface encircling the cylindrical mold member;
   providing multiple circumferentially spaced driving elements associated with the peripheral surface of the mold member;

providing an endless, flexible mold band having injection ports therein;

providing multiple driven elements at longitudinally spaced positions in the mold band adapted for engagement with the driving elements;

positioning the driven elements in the mold band relative to said injection ports for producing registration of the injection ports with said endless mold cavity with said injection ports being adjacent to and in direct communication with said endless mold cavity upon engagement of the driven elements with the driving elements;

revolving the cylindrical mold member around the axis of rotation;

engaging the driven elements with the driving elements for causing the mold band to be revolved in contact with and in registration with the peripheral surface of the cylindrical mold member with said mold band overlying said mold cavity and being the only one mold band associated with said mold cavity;

performing a step of changing temperature of the revolving mold member and the band in a first predetermined direction of temperature change;

injecting fluid plastic material through said injection ports into said mold cavity following said temperature change for filling the endless mold cavity beneath said mold band and for filling injection ports in the mold band adjacent to and in direct communication with said mold cavity;

performing a step of changing temperature of the revolving mold member and the band in a second predetermined direction of temperature change opposite to said first predetermined direction of temperature change following the injection for solidifying the plastic material in the endless mold cavity and in said injection ports adjacent to and in direct communication with said endless mold cavity for producing a continuous strip of solid molded product in the mold cavity with lugs on the strip;

guiding the revolving mold band away from the revolving mold member following solidification of the plastic material in said endless cavity and in said injection ports adjacent to and in direct communication with said endless cavity;

removing the continuous strip of molded product from the endless mold cavity and removing the lugs from the injection ports; and guiding the revolving mold band back into contact with the revolving peripheral surface of the mold member with the driven elements again engaging the driving elements and the injection ports in the mold band again in registration with the endless mold cavity in readiness for continuing operation.

2. The method of claim 1, wherein:

said driving elements are sprocket teeth and said driven elements are sprocket holes in said mold band.

3. The method of claim 1, including the step of:

mounting the circular cylindrical mold member on a drum which is rotatable about said axis of rotation.

4. The method of claim 2 wherein the circular cylindrical mold member has two margins, including the steps of:

positioning the sprocket holes in the mold band along respective margins of the mold band;

providing a pair of circular reinforcing hoops;

putting the reinforcing hoops inside of the respective margins of the cylindrical mold member in supporting relationship with the margins;

providing apertures in the margins of the cylindrical mold member;

providing sockets in the reinforcing hoops in alignment with said apertures; and mounting sprocket teeth in said sockets extending through said apertures and projecting beyond the peripheral surface of the cylindrical mold member adapted for engaging in sprocket holes in the margins of the mold band.

5. The method of claim 1, wherein:

the fluid plastic material being injected is melted thermoplastic material; and said performing of said step of changing temperature of the revolving mold member and band in said first predetermined direction of temperature change prior to injection is a heating step for heating the mold band and cylindrical mold member for keeping the thermoplastic material in fluid condition during injection; and said performing of said step of changing temperature of the revolving mold member and band in said second predetermined direction of temperature change following injection is a cooling step for cooling the injected thermoplastic material for solidifying the continuous strips of molded plastic product with said lugs thereon.

6. The method of claim 1, wherein:

the fluid plastic material being injected is thermosettable plastic material in fluid condition; and said performing of said step of changing temperature of the revolving mold member and band in said first predetermined direction of temperature change prior to injection is a cooling step for cooling the mold band and cylindrical mold member below thermoset temperature of the fluid thermosettable plastic material being injected; and said performing of said step of changing temperature of the revolving mold member and band in said second predetermined direction of temperature change following injection is a heating step for heating the fluid thermosettable plastic material above its thermosetting temperature for solidifying the continuous strip of molded plastic product with said lugs thereon.

7. The system for continuous injection molding of at least one continuous strip of molded plastic product having lugs thereon comprising:

a circular cylindrical mold member rotatably mounted for rotation around an axis of rotation concentric with a peripheral surface of the cylindrical mold member with drive means for turning said mold member in a rotational direction around said axis;

said peripheral surface having at least one endless mold cavity extending circumferentially therein encircling the cylindrical mold member;

sprocket teeth projecting above said peripheral surface;

an endless flexible mold band having injection ports therein;

said mold band having sprocket holes therein engageable with said sprocket teeth with said mold band being in contact with said peripheral surface of the cylindrical mold member and with said mold band being revolved by said sprocket teeth;

said mold band overlying said endless mold cavity with said injection ports being adjacent to said endless mold cavity in direct communication with said endless mold cavity for forming with said endless mold cavity in said revolving cylindrical mold member an endless revolving injection mold;

said mold band being one and the only one mold band associated with said endless mold cavity;

said sprocket holes in the mold band being positioned relative to the injection ports in the mold band for registering said injection ports adjacent to said endless mold cavity in direct communication with said endless mold cavity;

fluid plastic feeder means having an injection head communicating with said injection ports in the revolving mold band for injecting fluid plastic material through said injection ports into said endless mold cavity filling said endless mold cavity and said injection ports adjacent thereto in direct communication therewith;

heating and cooling means operatively associated with the revolving cylindrical mold member and mold band for changing temperature of the revolving mold member and mold band in a first predetermined direction of temperature change prior to injecting of the fluid plastic material for keeping the plastic material sufficiently fluid for injection and for changing the temperature of the revolving mold member and mold band in a second predetermined direction of temperature change opposite to said first predetermined direction of temperature change following injection for solidifying the plastic material in the mold cavity for producing a continuous strip of molded plastic product in the mold cavity with lugs thereon extending into the injection ports;

guide means for guiding the revolving mold band away from the revolving mold member following solidification of the plastic material;

means for removing the continuous strip of molded plastic material from the mold cavity and for removing the lugs thereon from the injection ports; and said guide means guiding the revolving mold band back into contact with the revolving peripheral surface of the mold member with the sprocket holes again engaging with the sprocket teeth and the injection ports in the mold band again in registration with the mold cavity in readiness for continuing injection.

8. The system of claim 7, in which:

said heating means comprise first heating means for heating an exterior surface of said mold band prior to injection and second heating means for heating an interior surface of said mold member prior to injection; and said cooling means comprise first cooling means for cooling said exterior surface of said mold band subsequent to injection and second cooling means for cooling said interior surface of said mold member subsequent to injection.

9. The system of claim 8, in which:

said circular cylindrical mold member has a coefficient of thermal expansion matching a coefficient of thermal expansion of said mold band.

10. The system of claim 8, wherein said circular cylindrical mold member is thin in its radial direction for reducing its thermal mass, said mold member has two margins and said mold band has two margins, further comprising:

said sprocket holes being positioned along both margins of the mold band;

a pair of circular elements;

said circular elements being positioned inside of the respective margins of the cylindrical mold member in contact with said respective margins in supporting relationship with said margins;

said margins of the cylindrical mold member having apertures therein;

said sprocket teeth being mounted on said circular elements and extending through said apertures and projecting above the peripheral surface of the cylindrical mold member adapted for engaging in the sprocket holes in the margins of the mold band.

11. The system of claim 7, in which:

the fluid plastic material being injected is melted thermoplastic material;

said heating means comprise first and second heating means;

said first heating means being positioned in heating relationship with said mold band in advance of said injection head relative to said rotational direction; and said second heating means being positioned in heating relationship with said mold member in advance of said injection head relative to said rotational direction for heating the mold band and cylindrical mold member for keeping the thermoplastic material in fluid condition during injection; and said cooling means comprise first and second cooling means;

said first cooling means being positioned in cooling relationship with said mold band after said injection head relative to said rotational direction; and said second cooling means being positioned in cooling relationship with said mold member after said injection head relative to said rotational direction for cooling the injected thermoplastic material for solidifying the continuous strip of molded plastic product with lugs thereon.

12. The system of claim 7, in which:

the fluid plastic material being injected is thermosettable plastic material in fluid condition;

said cooling means cooling the revolving mold member and mold band prior to injection for cooling the mold band and cylindrical mold member below thermoset temperature for keeping the material in fluid condition during injection, and said heating means heating the revolving mold member and mold band following injection for heating the thermosettable plastic material in the mold cavity and in the injection ports for solidifying the continuous strip of molded plastic product with lugs thereon.

13. The system for continuous injection molding of at least one continuous strip of molded plastic product having lugs thereon comprising:

a circular cylindrical mold member rotatably mounted for rotation around an axis of rotation concentric with a peripheral surface of the cylindrical mold member and having drive means for turning said mold member in a rotational direction around said axis;

said peripheral surface having at least one endless mold cavity extending circumferentially therein encircling the cylindrical mold member;

first driving elements associated with said cylindrical mold member;

an endless flexible mold band having injection ports therein;

said mold band having second driving elements engageable with said first driving elements when said mold band is in contact with said peripheral surface of the cylindrical mold member for moving said mold band by engagement with said first driving elements;

said mold band overlying said endless mold cavity when said mold band is in contact with said peripheral surface with said injection ports being adjacent to said endless mold cavity in direct communication with said endless mold cavity for forming with said endless mold cavity an endless revolving injection mold;

said mold band being only one mold band associated with said endless mold cavity;

said second driving elements being positioned relative to the injection ports in the mold band for registering said injection ports adjacent to said endless mold cavity in direct communication with said endless mold cavity;

fluid plastic feeder means having an injection head communicating with said injection ports in the moving mold band for injecting fluid plastic material through said injection ports into said endless mold cavity for filling said endless mold cavity and said injection ports adjacent thereto in direct communication therewith;

temperature control means operatively associated with the rotating cylindrical mold member and moving mold band for changing temperature of the peripheral surface of the cylindrical mold member and mold band for solidifying the plastic material in the mold cavity and in said injection ports for producing a continuous strip of molded plastic product in the mold cavity with lugs thereon extending into the injection ports;

guide means for guiding the moving mold band away from the rotating mold member following solidification of the plastic material;

means for removing the continuous strip of molded plastic material from the mold cavity and for removing the lugs thereon from the injection ports; and said guide means including means for guiding the moving mold band back into contact with the peripheral surface of the rotating mold member with the second driving elements again engaging with the first driving elements and the injection ports in the mold band again in registration with the mold cavity.

14. The system claimed in claim 13, in which:

said fluid plastic material is thermoplastic material in a heated fluid state; and said temperature control means cools the rotating cylindrical mold member and cools the moving band for solidifying fluid thermoplastic material in the mold cavity and in said injection ports.

15. The system claimed in claim 13, in which:

said cylindrical mold member has a coefficient of thermal expansion matching a coefficient of, thermal expansion of said mold band.

16. The system claimed in claim 14, in which:

said cylindrical mold member has a coefficient of thermal expansion matching a coefficient of thermal expansion of said mold band.

17. The system claimed in claim 14, in which:

said cylindrical mold member has an interior region; and said temperature control means applies cold fluid to said cylindrical mold member in said interior region.

18. The system claimed in claim 13, in which:

said cylindrical mold member has two margins;

said cylindrical mold member is thin in its radial direction for reducing its thermal mass;

a pair of reinforcing members are positioned inside of respective margins of said cylindrical old member;

said reinforcing members being in supporting relationship with said margins; and said first driving elements are carried by said reinforcing members.

* * * * *